United States Patent [19]

Gamberini et al.

[11] Patent Number: 4,883,163
[45] Date of Patent: Nov. 28, 1989

[54] APPARATUS AND METHOD FOR REGULARLY SPACING APART RANDOMLY SPACED OBJECTS WHILE CONVEYING THEM

[75] Inventors: Antonio Gamberini, Bologna; Fiorenzo Draghetti, Medicina, both of Italy

[73] Assignee: G.D. Società per Azioni, Bologna, Italy

[21] Appl. No.: 128,883

[22] Filed: Dec. 4, 1987

[30] Foreign Application Priority Data

Dec. 17, 1986 [IT] Italy ................................. 3612 A/86

[51] Int. Cl.$^4$ ............................................. B65G 43/00
[52] U.S. Cl. ................................. 198/460; 198/471.1; 198/626
[58] Field of Search .................... 198/460, 462, 471.1, 198/475.1, 474.1, 803.5, 457, 626

[56] References Cited

U.S. PATENT DOCUMENTS

| | | | |
|---|---|---|---|
| 2,010,486 | 8/1935 | Herrmann | 198/457 |
| 2,093,437 | 9/1937 | Gwinn | 198/471.1 X |
| 2,362,132 | 11/1944 | Haub | 198/474.1 X |
| 3,302,803 | 2/1967 | Mooney | 198/471.1 X |
| 3,900,096 | 8/1975 | Nack et al. | 198/457 |
| 3,941,233 | 3/1976 | Aiuola et al. | 198/471.1 |
| 4,564,329 | 1/1986 | Bantien | 198/474.1 X |
| 4,722,432 | 2/1988 | Staton | 198/471.1 |

FOREIGN PATENT DOCUMENTS

| | | | |
|---|---|---|---|
| 3612104 | 10/1986 | Fed. Rep. of Germany | 198/626 |
| 2148830 | 6/1985 | United Kingdom | 198/475.1 |

Primary Examiner—Robert J. Spar
Assistant Examiner—Cheryl L. Gastineau
Attorney, Agent, or Firm—Cushman, Darby & Cushman

[57] ABSTRACT

The apparatus and method concerns transferring commodities from A to B, distancing them at regular intervals in the same operation. Commodities traveling in random succession along a conveyor with a low coefficient of friction are gathered into a single file, one touching the next, by the braking action of a pair of belt loops offering surfaces that possess a high coefficient of friction; the speed of the two belt loops is adjusted utilizing a photoelectric beam that monitors the position of the leading commodity on its arrival at the pick-up point, where suckers carried by a continuously revolving turret collect the single commodities one by one and transfer them to a second conveyor equipped with side fences and transverse ridges which ensure correct position and spacing.

15 Claims, 3 Drawing Sheets ically spacedly spaced objects while conveying them

APPARATUS AND METHOD FOR REGULARLY SPACING APART RANDOMLY SPACED OBJECTS WHILE CONVEYING THEM

BACKGROUND OF THE INVENTION

The invention disclosed relates to a method and apparatus of transferring randomly conveyed commodities from one location to another and distancing them one from the next at a regular, prescibed interval.

More exactly, the invention consists in a method and apparatus of transferring packs of cigarettes from the runout of a packaging machine to the entry line of a unit which envelops them in outer wrappers or cellophane.

In conventional systems, packs of cigarettes run out from a packaging machine on a continuously driven conveyor, and on reaching the end of this conveyor, are transferred onto a second conveyor, the infeed conveyor of a cellophane wrapping unit. The packs move along the first conveyor in random succession, but must be supplied to the cellophane wrapping unit in regular sequence, precisely synchronized with the movements of the unit's working parts. Accordingly, in passing from one conveyor to the other (the two are generally disposed at right angles), the packs must also be spaced apart at a given distance one from the next.

Conventionally, this operation is effected in the following manner: the far extremity of the runout conveyor incorporates a fixed stop against which a string of packs is allowed to accumulate, one in contact with the next; an actuator, made to reciprocate at the same tempo as that to which the operation of the cellophane wrapping unit is geared, impinges on the packs nearest the stop singly and in turn, transferring them to the infeed conveyor.

To ensure that the packs of cigarettes will not jump when coming up against the stop, and that the string accumulates neately and correctly, the surface of the first conveyor possesses a high coefficient of friction; in addition, the conveyor operates in conjunction with a plate that overrides the endmost part nearest the stop and is positioned so that the packs of cigarettes remain sandwiched between it and the conveyor.

With this type of arrangement, packs awaiting transfer alongside the stop become subject to damage caused by rubbing contact with the surface of the conveyor, which, it will be remembered, is embodied with a high coefficient of friction.

Moreover, following each transfer stroke effected by the actuator, the entire string of packs surges forward and strikes against the stop, occasioning a shock which not only is a cause of damage to those packs nearest the stop, which become crushed, but also, is rebounded back through the entire string. Needless to say, for each pack making up the string accumulating at the stop, this shock rebound will be repeated, and repeated as many times as there are steps separating the pack from its ultimate transfer to the second conveyor.

Accordingly, the object of the invention is to set forth a method of transferring commodities from a first conveyor to a second conveyor, ordering them at one and the same moment into a regularly spaced succession, which is able to overcome the various drawbacks besetting the prior art method described above.

SUMMARY OF THE INVENTION

The stated object is achieved with the method according to the invention; such a method envisages transferring randomly conveyed commodities from one point to another and spacing them apart at regular intervals, and comprises the step of utilizing a brake means to decelerate commodities travelling in random succession along a continuously driven first conveyor, in such a way as to gather them into a single file, one in contact with the next, whereupon pick-up members, carried by a continuously revolving turret, are used to remove single commodities from the file while moving forward, and transfer them to a second conveyor.

In the method disclosed monitoring and control means are employed to regulate the speed at which commodities travel when subject to the action of the brake, such that passage of the single commodities is timed to coincide with passage of the respective pick-up member.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
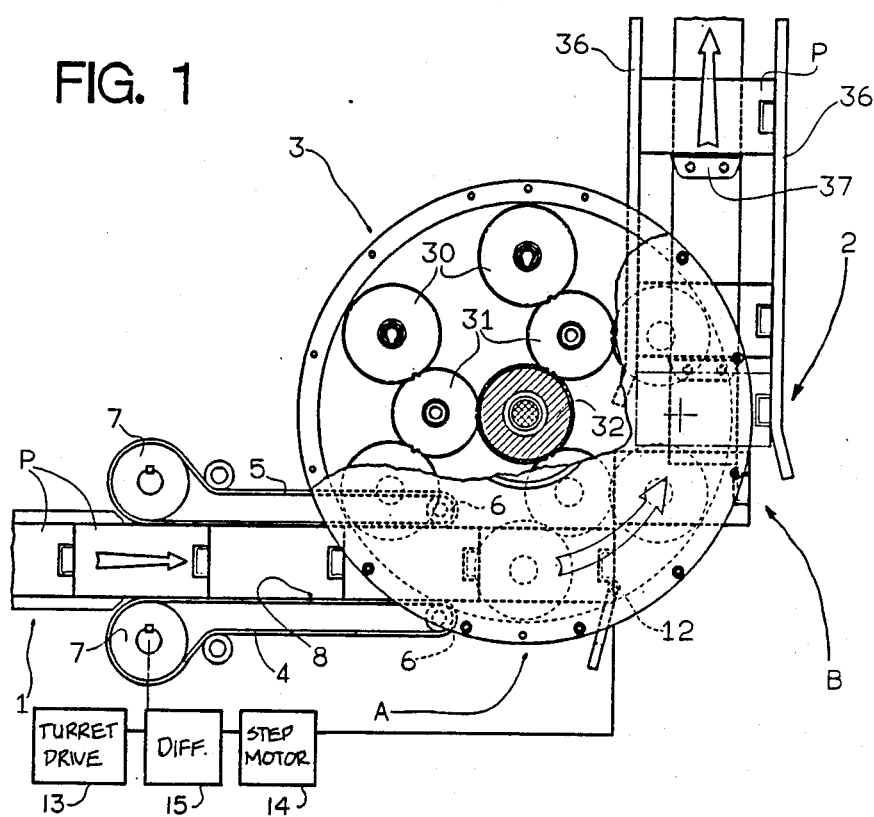
FIG. 1 is the schematic representation of a device for implementation of the method disclosed, viewed in plan.
Figure 2:
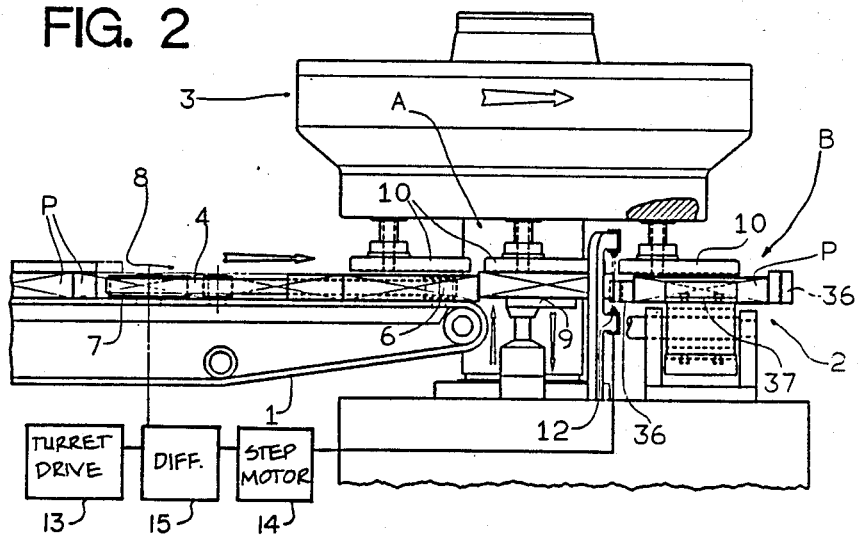
FIG. 2 is a schematic representation of the device in FIG. 1, seen in side elevation.

With reference to FIGS. 1 and 2 of the drawings, 1 denotes a first conveyor carrying packs P away from a packaging machine (not illustrated).

The packs P, proceeding in random succession, are carried toward a point A from where they are picked up singly and transferred, facing all the while in the same direction, to a set-down point B coinciding with the entry to a second conveyor 2, of which more will be said in due course.

It will be observed that the surface of the first conveyor 1 possesses a low coefficient of friction, the reason for which will become apparent.

4 and 5 denote two transversally-spacedly confronting belts located at the end of the first conveyor 1 from which the packs P run out, which constitute braking means. Each transversally-spacedly confronting belt 4 and 5 is passed around a freely revolving roller 6 and a drive roller 7, both of which are disposed upon a vertically axis, the mutually opposed branches of the control belts 4 and 5 cooperate with the first conveyor 1 to form a channel 8. The control belts 4 and 5 are embodied with surfaces (not shown) possessing a high coefficient of friction, and are driven continuously in one direction at variable speed, the reason for which will become apparent.

An elevator 9, positioned alongside the end of a conveyor 1 adjacent to the pick-up point A elevator 9 reciprocates vertically between a lowered position, in alignment with the uppermost surface of the adjoining conveyor 1, and a raised position, such that each upward stroke will lift one pack P to a position in which it can be collected by a pick-up member 10 carried on a revolving turret 3. The turret 3 constitutes an intermediate conveyor bridging the first and second conveyors 1 and 2, and the points at which packs P are picked up and set down, A and B respectively, are spaced apart through 90° along the circular trajectory followed by the pick-up members 10 as the turret 3 rotates.

The elevator 9 is reciprocated by a drive line (not shown) taken off the shaft that turns the turret 3, in such a way that an upward stroke is effected as each pick-up member 10 passes through the station occupied by the elevator 9.

A photoelectric cell 12 is situated downstream of the elevator 9 and monitors the position of each pack P raised by the elevator 9 in readiness for collection by the pick-up member 10.

Figure 6:
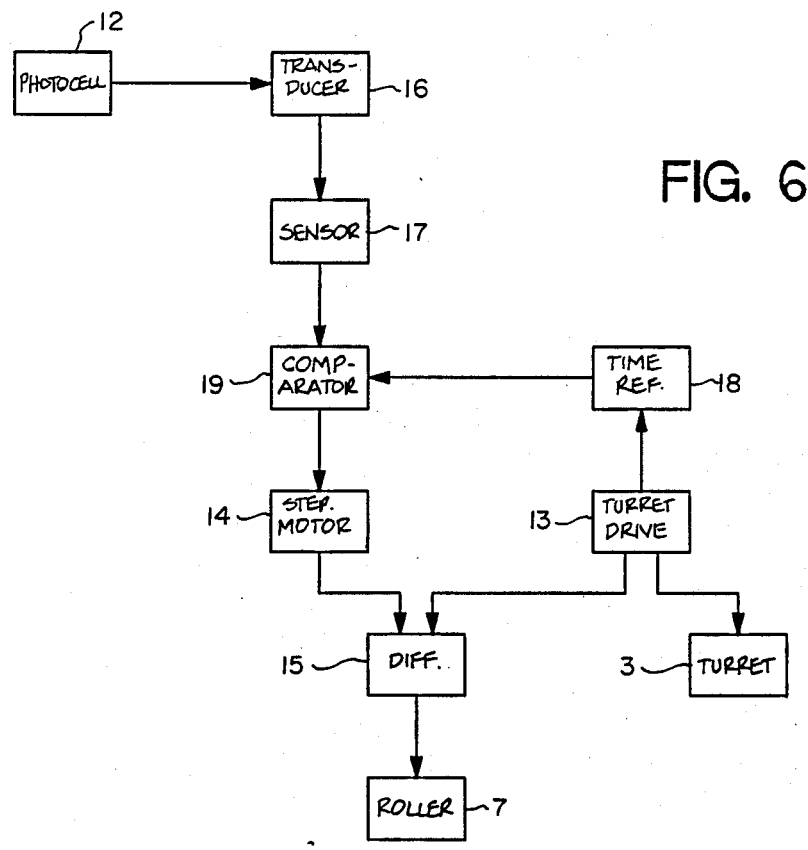
FIG. 6 is a block diagram of monitoring and control means forming part of the device as illustrated.

Observing FIGS. 1, 2 and 6, it will be seen that a photoelectric cell 12 is electrically connected to a motor 14 by which the two drive rollers 7 of the belt loops 4 and 5 are turned, a stepping motor for example, and, via the motor 14, to a control device including a signal differential device 15 with two inputs, one of which is connected to the output of the turret drive 13, and the other to the output of the stepping motor 14.

The stepping motor 14 is provided with a control circuit including a transducer 16, designed to put an electrical signal that is proportional to the intensity of a beam falling on the receiver of the photoelectric cell 12, activated at the moment of arrival of a pack P in the area occupied by the elevator 9, and of a pick-up member 10 at the pick-up point A. The motor control circuit further includes a timing sensor 17 which relays a signal when peak intensity of the beam so registers; also, a timing reference 18 connected to the turret drive 13, which produces a signal when a pack P is precisely in position on the elevator 9.

The control circuit also comprises a compartor 19 the inputs of which are in receipt of the timing signals from the sensor 17 and the reference 18; the output of the comparator is connected to the stepping motor 14, and supplies a signal that is proportional to the difference between the two input signals. Accordingly, the stepping motor 14 can be operated to cancel out the output signal from the comparator, thereby increasing or decreasing the speed of the rollers 7, via the differential 15, so as to vary the speed of the control belts 4 and 5.

Figure 3:
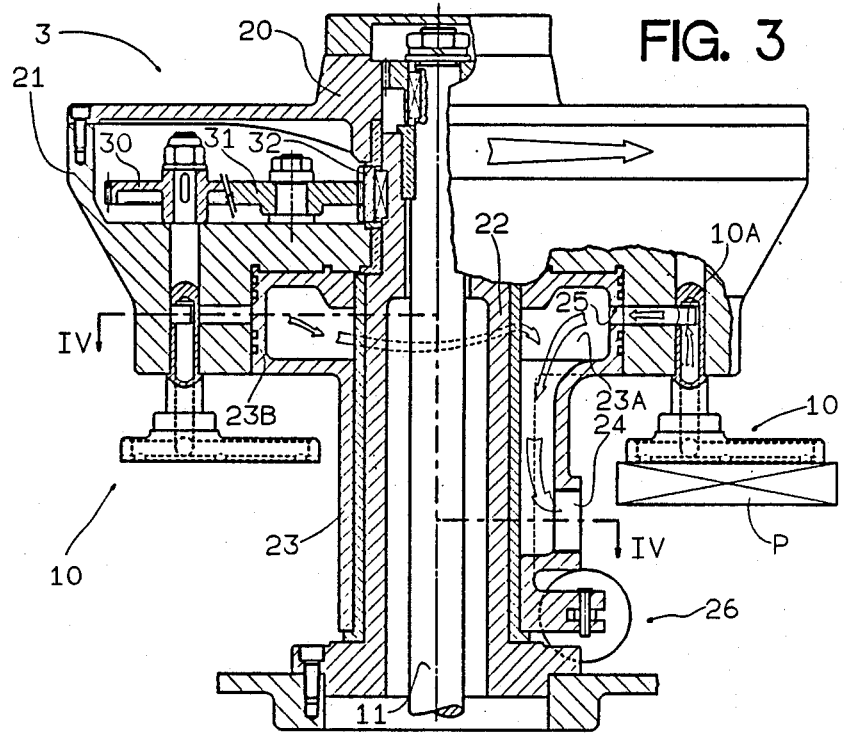
FIG. 3 is the section through III—III in FIG. 4, seen in enlarged scale, which illustrates a detail of FIGS. 1 and 2.

Referring to FIGS. 1, 2 and 3, the pick-up members 10 are carried by the revolving turret 3 and remain oriented in the same direction as the turret 3 rotates.

Observing FIG. 3 in particular, device 11 denotes the shaft of the revolving turret 3, which is rotated by the drive denoted 13; drive 13 can be formed by an independent motor, or a power take-off from an external device (not shown) into which the present invention is incorporated. The top end of the shaft 11 is keyed into a flange 20, to which the shell 21 of the turret 3 is fastened. Numeral 22 denotes the hub of the turret; a sleeve 23 fitted fluid-tight over the hub and encompasses a chamber 23A that connects by way of a port 24 with a source of suction pressure (not shown). The fluid-tight sleeve 23 is coaxial with the turret 3, its top part 23B located internally of the shell 21. A slot 25, or a timing aperture, passes through the cylindrical part of the sleeve 23 and extends through an arc of 90° (see FIGS. 3 and 4).

The pick-up members 10 act as suckers through suction ducts 10A that emerge into the space encompassed by the shell 21, on a level with the slot 25. Arranged thus, the pick-up members 10 are connected with suction throughout the passage between point A, at which single packs P are picked up, and point B, where they are set down on the second conveyor 2.

The position of the sleeve 23 relative to the hub 22 is adjusted using a device 26, by which the sleeve 23 can be rotated right or left to alter the position of the slot 25 in relation to lines passing radially through the center of the pick-up point A and of the set-down point B. Thus, considering the work cycle of the machine to be one full revolution of the turret 3, it becomes possible to advance or to retard the connection of the ducts 10A with the chamber 23A with suction, which brings about operation of the pick-up members 10.

Figure 4:
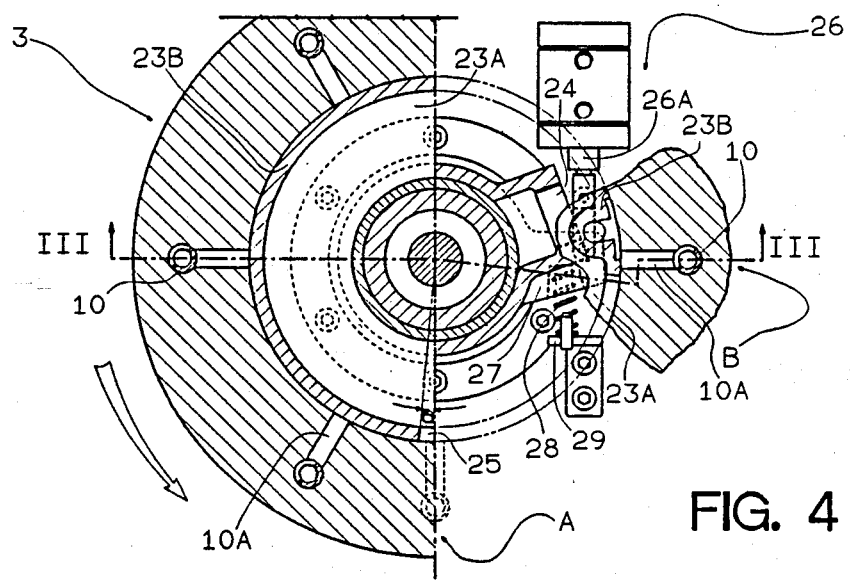
FIG. 4 is the section through IV—IV in FIG. 3.

The adjuster device 26 can be embodied as a fluid power cylinder, the rod 26A of which is fixed to an appendage 27 that projects laterally from the sleeve 23 and is biased against the action of the rod 26A by a spring 28 seated against a shoulder 29 rigidly associated with the hub 22. More exactly, when the tempo of the line increases, the device 26 can be instructed by monitoring means (not shown) to rotate the sleeve 23 clockwise, as seen in FIG. 4, in such a way that the slot 25 is shifted through a given angle "a" in relation to the centers of the pick-up and set-down points A and B; accordingly, the step in which a pack P is picked up and set down will be prevented from falling behind the increased speed of the line.

To reiterate, the direction in which the packs P are disposed does not change during their passage from point A to point B. Conventional means are used to produce such a passage, namely, an epicyclic gear train (FIGS. 1 and 3) incorporating outer planets 30 which carry the single pick-up members 10 and mesh with inner planets 31; the inner planets mesh with a sun wheel 32 keyed to the hub 22 of the turret.

Operation of one embodiment the invention will now be described. Assume a situation in which the conveyors 1 and 2 are both running, the elevator 9 disposed in alignment with the surface of the first conveyor 1, the control belts 4 and 5 turning, the turret 3 revolving, a pick-up member 10 approaching point A, a pack P occupying the elevator 9, the photoelectric cell 12 activated, and the sleeve 23 positioned so that the ends of the slot 25 coincide radially with the respective axes of the pick-up and set-down points A and B.

The elevator 9 moves upward, raising the pack P toward the pick-up member 10; the pack also slides forward during this upward movement, pushed on by the string of packs accumulating at the end of the first conveyor 1 between the belt loops 4 and 5. As the pack P just raised is transferred toward the set-down point B by the sucker 10, the elevator 9 will return to the fully lowered position before the next pack P in line can strike against its edge.

Pack P will then move onto the elevator 9 and be raised into contact with a further pick-up member 10, which in the meantime has gained the pick-up point A.

In the event of a pack P arriving at point A earlier or later than a prescribed instant, the error is detected by the photoelectric cell 12, its response cascading through the timing sensor 17 and into the comparator 19; comparison is duly effected with the output signal from the reference 18, and a control signal instructing an appropriate correction is sent to the stepping motor 14.

The differential 15, which is interlocked to the stepping motor 14, trims the speed of the drive rollers 7 so as to correct the rate of feed through the control belts 4 and 5 and return the output signal from the comparator 19 to zero. Speed control of control belt 4 and 5 is thus infinitely variable and immediate, and operating conditions can therefore be maintained at optimum. This type of control over the speed of the control belts 4 and 5 gives an immediate correction facility as regards arrival of the packs P, inasmuch as their position on the elevator 9 is guaranteed correct at the moment of collection by the pick-up member 10.

Correction is effected upstream of the pick-up point A, and therefore cannot totally preclude the possibility of a pack P shifting out of alignment when collected by the pick-up member 10. Accordingly, means of adjustment are incorporated into the second conveyor 2 including fixed guide fences 36, with ridges 37 fastened to the surface of the conveyor 2 at regular intervals. The fences 36 exhibit angled regions which effect a gradual correction of any slight inaccuracy in the position of a pack P, as regards alignment with the conveyor 2, whilst the trailing edge of each pack P separated from the pick-up members 10 is engaged by one of the ridges 37; thus, the packs P are fed into the downstream machine squared up, and spaced apart one from the next at a prescribed distance.

Figure 5:
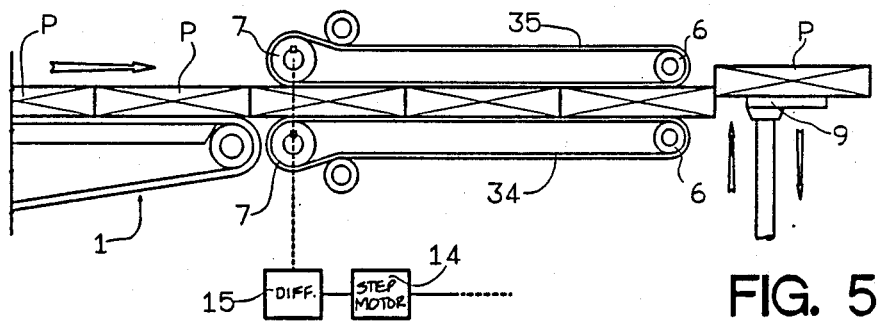
FIG. 5 illustrates an alternative embodiment of the device shown in FIGS. 1 . . . 4.

FIG. 5 illustrates an alternative embodiment of the braking means. In a second embodiment, the two vertical control belts 4 and 5 are replaced by a pair of horizontally disposed belts 34 and 35 situated between the end of the first conveyor 1 and the elevator 9; Belts 34 and 35 could also be disposed in conjunction with control belts 4 and 55.

Further, the turret device described can be situated in such a way that transfer of the commodities occurs either in a horizontal or vertical plane. For example, the embodiment of FIG. 1 could represent the front elevation of a turret supplying a vertically disposed infeed conveyor 2, in which case, one would adopt a different arrangement of the first conveyor 1 in relation to the packs P, and if need be, of the belts 4 and 5 or 34, 35 in relation to the conveyor 1.

It can be appreciated that the method according to the invention and implemented by way of the device described in the foregoing, is capable of overcoming all those drawbacks typical of a prior art device. Commodities are transferred from one conveyor to the other without drawing to a halt, such that no damage can occur either through compaction, or as a result of striking against obstacles such as the fixed stop of prior art embodiments. Furthermore, commodities are not subject to damage through conveyor friction when travelling along the conveyors, as occurs in prior art handling methods, and finally, it will be seen that the method disclosed enables faultless spacing of the commodities one from the next during transit.

What is claimed is:

1. Apparatus for accepting a succession of like objects having a similar spatial orientation but arriving with irregular timing from one object to the next, and outputting the objects in succession with both a similar spatial orientation and a regular spacing from one object to the next, while conveying the objects along a path, said apparatus comprising:

a first conveyor having a first conveying surface extending along said path from an accepting end to a delivery end of said first conveyor, and means for advancing said first conveying surface in a downstream direction, for advancing a succession of like objects having a similar spatial orientation but arriving with irregular timing from between objects, from said accepting end to said delivery end of said first conveyor;

a second conveyor having a second conveying surface extending along said path, downstream of said first conveyor, from an accepting end to a delivery end of said second conveyor, and means for advancing said second conveying surface in a downstream direction, for advancing a succession of like objects having a similar spatial orientation and placed thereon proximally of said accepting end of said second conveyor, with regular spacing between objects;

a continuously rotating turret mounted for continuous rotation about an axis which carries successive peripheral portions of said turret along said path so that such successive peripheral portions are each successively juxtaposed with said delivery end of said first conveyor and said accepting end of said second conveyor;

each said peripheral portion carrying a respective pick-up head for picking up an object which has been conveyed to said delivery end of said first conveyor and delivering and depositing that object onto said second conveyor;

a braking means juxtaposed with said first conveyor beside said delivery end of said first conveyor, for engaging objects successively conveyed into proximity therewith on said first conveying surface, said braking means comprising a pair of endless belts having object-engaging runs which transversally-spacedly confront one another across path in juxtaposition with said first conveyor; and variable speed means for running said belts so that the object-engaging runs thereof advance at a controlled speed which is continuous, but slower than that of said first conveying surface, whereby the succession of like objects being conveyed by the first conveyor becomes condensed into a single file of serially engaged objects including an advancing leading said object which becomes positioned to be picked-up by a respective pick-up head as said turret rotates; and means responsive to spatial positioning of successive ones of said leading objects in relation to rotation of said turret, for adjusting the speed of said means for running said belts, for causing each said leading object, while continuously advancing, to become located at an appropriate location to be picked-up by a next said pick-up head as such pick-up head becomes ready to pick-up the respective leading object.

2. The apparatus of claim 1, further including:

a pusher juxtaposed with the turret at a site where said pick-up heads successively pick-up successive leading objects at said delivery end of said first conveyor; and means for operating said pusher when a respective said pick-up head has become aligned with a respective said leading object for engaging that leading object with that pick-up head for facilitating connection of that leading object to that pick-up head for transfer by that pick-up head to the second conveyor.

3. The apparatus of claim 1, further comprising:

a succession of regularly spaced ridges provided on said second conveying surface, each being shaped and oriented to engage an end of a respective said object if being deposited slightly longitudinally out of position on said second conveying surface for thereby guiding that object to a respectively correct position.

4. The apparatus of claim 1, wherein:
said object-engaging runs of said pair of endless belts of said braking means confront one another across said first conveying surface; and
said first conveying surface is sufficiently low-friction in relation to said objects to be conveyed thereon, in use, that, as those objects are decelerated by said object-engaging runs of said pair of endless belts, the first conveying surface can slip along said path in relation to those objects.

5. The apparatus of claim 1, further comprising:
a pair of fences which transversally-spacedly confront one another across said second conveyor for engaging opposite sides of respective said objects deposited onto said second conveying surface by said pick-up heads, for laterally regularizing positioning of such objects on said second conveyor.

6. The apparatus of claim 5, further comprising:
a succession of regularly spaced ridges provided on said second conveying surface, each being shaped and oriented to engage an end of a respective said object if being deposited slightly longitudinally out of position on said second conveying surface for thereby guiding that object to a respectively correct position.

7. The apparatus of claim 1, wherein:
said turret is located at a right-angle bend in said path, the first and second conveyors being disposed at right angles to one another.

8. The apparatus of claim 1, wherein:
said means responsive to spatial positioning of successive ones of said leading objects includes a photoelectric cell for providing a signal indicative of spatial positioning of a respective said leading object in relation to an expected position, and said means for running said belts includes a variable speed transmission operatively coupled to drive means for running said belts.

9. The apparatus of claim 1, wherein:
said pick-heads are suction-type pick-up heads which temporarily connect with said objects when transferring said objects by sucking said objects thereof; and
said turret further includes means for successively communicating suction to each pick-up head when that pick-up head is to pick-up and transfer an object and for cutting-off communication of suction to that pick-up head when that pick-up head is to release an object transferred thereby;
said means for successively communicating suction including means for selectively advancing and retarding communication of suction to said pick-up heads in succession in relation to rotation of said turret.

10. The apparatus of claim 9, wherein:
said means for successively advancing and retarding communication includes means for monitoring speed of rotation of said turret and for advancing and retarding communication of suction to said pick-up heads in succession in relation to speed of rotation of said turret.

11. The apparatus of claim 1, wherein:
said first and second conveying surfaces face upwardly and said axis of said turret is vertical.

12. The apparatus of claim 11, wherein:
said object-engaging runs of said pair of endless belts of said braking means confront one another across said first conveying surface; and
said first conveying surface is sufficiently low-friction in relation to said objects to be conveyed thereon, in use, that, as those objects are decelerated by said object-engaging runs of said pair of endless belts, the first conveying surface can slip along said path in relation to those objects.

13. The apparatus of claim 12, wherein:
said turret is located at a right-angle bend in said path, the first and second conveyors being disposed at right angles to one another.

14. The apparatus of claim 1, wherein:
said first conveying surface faces upwardly and said object-engaging runs of said pair of endless belts are arranged to engage upper and lower sides of the objects being decelerated thereby.

15. A method for accepting a succession of like objects having a similar spatial orientation but arriving with irregular timing from one object to the next, and outputting the objects in succession with both a similar spatial orientation and a regular spacing from one object to the next, while conveying the objects along a path,
said method comprising:
(a) providing a first conveyor having a first conveying surface extending along said path from an accepting end to a delivery end of said first conveyor;
(b) providing a second conveyor having a second conveying surface extending along said path, downstream of said first conveyor, from an accepting end to a delivery end of said second conveyor;
(c) providing a continuously rotating turret rotating about an axis which carries-successive peripheral portions of said turret along said path so that such successive peripheral portions are each successively juxtaposed with said delivery end of said first conveyor and said accepting end of said second conveyor;
(d) providing on each said peripheral portion of said turret a respective pick-up head for picking-up an object which has been conveyed to said delivery end of said first conveyor and delivering and depositing that object onto said second conveyor;
(e) accepting a succession of like objects having a similar spatial orientation but arriving with irregular timing from one object to the next onto said first conveyor at said accepting end thereof and conveying such objects using said first conveying surface towards said delivery end of said first conveyor;
(f) engaging said objects with downstream-running braking devices which confront one another across the first conveyor at said delivery end of said first conveyor while continuously running such braking devices at a controlled speed which is less than that of said first conveying surface, and thereby decelerating said objects so as to condense the objects in succession at said downstream end of said first conveyor into a single file of objects which serially engage one another and include a respective downstream-moving leading object;

(g) as successive leading objects successively become juxtaposed with respective pick-up heads, successively picking-up said leading objects using said pick-up heads and delivering and depositing them onto said second conveying surface; and while conducting step (f), sensing spatial positioning of successive ones of said leading objects in relation to rotation of said turret and adjusting the speed of running of said braking devices for causing each leading object, while continuously advancing, to become located at an appropriate location to be picked-up by a next said pick-up head as such pick-up head becomes ready to pick-up the respective leading object.

* * * * *